Patented Nov. 9, 1943

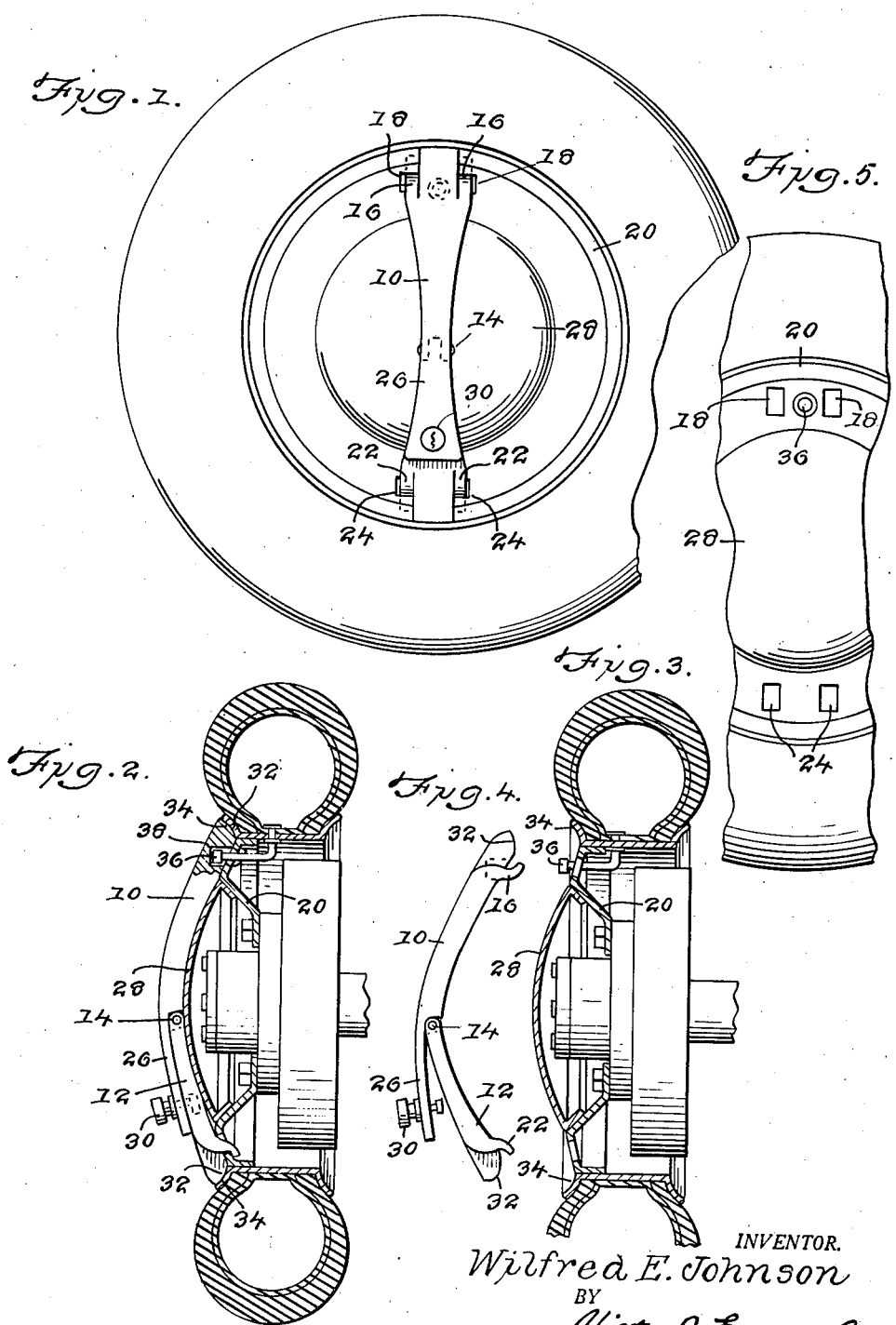

2,333,722

UNITED STATES PATENT OFFICE 2,333,722

COMBINED WHEEL AND TIRE LOCK

Wilfred E. Johnson, Superior, Wis.

Application March 30, 1942, Serial No. 436,880

6 Claims. (Cl. 70—259)

My invention relates to automotive vehicle tires and wheels, and has among its objects and advantages the provision of an improved wheel and tire lock designed to prevent the unauthorized removal of the tire or the wheel.

In the accompanying drawing:

Figure 1 is an elevational view of a conventional automobile wheel illustrating my invention applied thereto;

Figure 2 is a transverse sectional view of a conventional automobile wheel illustrating the tire and wheel lock partly in section;

Figure 3 is a similar view with the tire and wheel lock removed;

Figure 4 is a view of the tire and wheel lock; and

Figure 5 is a fragmentary elevational view of the wheel with the tire and wheel lock removed.

In the embodiment selected for illustration, I make use of a bar 10 having a companion bar 12 pivotally connected therewith at 14. Two lugs 16 are formed at the outer end of the bar 10 for projection through openings 18 provided in the usual wheel flange 20. Two similar lugs 22 are provided on the outer end of the companion bar member 12 for projection through two openings 24 in the wheel flange 20. The openings 18 and 20 are located on diametrically opposite sides of the wheel flange.

Figures 2 and 4 illustrate the bar 10 as having an extension 26 arranged to lie in overlapping engagement with the companion bar member 12 when the device is secured to the wheel flange 20 to bring both bars 10 and 12 into engagement with the usual hub cap 28. A key actuated lock 30 is carried by the extension 26 for coaction with the companion bar member 12 to lock the two bars together when in the position of Figure 2. When in the position of Figure 4, the lugs 16 and 22 are freely receivable in their respective openings 18 and 24. When the bar members are pressed against the hub cap 28, the end faces 32 of the bars 10 and 12 are brought into engagement with the tire flange 34. Figure 2 illustrates the tire inflating valve 36 as having its exterior end receivable in a recess 38 in the bar 10. Thus the inflating valve is enclosed within the bar 10 so as to be inaccessible, thereby preventing deflation of the tire with a view to removing the tire from the wheel. In addition, the bars 10 and 12 have engagement with the hub cap 28 so as to prevent its removal. Thus neither the tire valve nor the hub cap 28 may be tampered with until the locking device is removed from the wheel, and such removal is prevented without the aid of a key fitting the lock 30.

The lugs 16 and 22 are so fashioned as to draw the locking device into firm engagement with the cap 28 when the locking device is in the position of Figure 2.

Without further elaboration, the foregoing will so fully illustrate my invention, that others may, by applying current knowledge, readily adapt the same for use under various conditions of service.

I claim:

1. In an automotive vehicle wheel having a removable hub cap, a hub cap lock bar comprising first and second members each having a first latch means at one end and being pivotally connected together at a point remote from said first latch means, second latch means on said wheel located on opposite sides of said hub cap, said first latch means being connectingly engageable with the respective second latch means when said first and second members are pivoted to predetermined relative positions, said first and second members lying across and against the hub cap when said first and second members are pivoted to second relative positions, and key actuated means coacting with said first and second members to lock the latter against relative movement and hold the lock bar rigidly against the hub cap.

2. The invention described in claim 1 wherein said wheel is provided with an inflating valve and in which said lock bar is shaped to cover the inflating valve to provide a tamperproof guard therefor.

3. The invention described in claim 1 wherein said second and first latch means respectively comprise openings in the wheel and lugs on said first and second members receivable in the openings.

4. The invention described in claim 1 wherein said wheel includes a wheel flange and in which said second and first latch means respectively comprise openings in said wheel flange and lugs on said first and second members receivable in said openings.

5. The invention described in claim 1 wherein said wheel includes a wheel flange and a tire flange and in which said second and first latch means respectively comprise openings in said wheel flange and lugs on said first and second members receivable in said openings, with the first and second members having end engagement with said tire flange.

6. The invention described in claim 1 wherein said wheel is provided with an inflating valve having an accessible end and in which said first member is provided with a pocket receiving said accessible end to constitute a protective guard for the inflating valve.

WILFRED E. JOHNSON.